No. 626,263. Patented June 6, 1899.
K. ZWART.
COUPLING FOR RAILWAY CARRIAGES.
(Application filed Feb. 21, 1899.)
(No Model.)
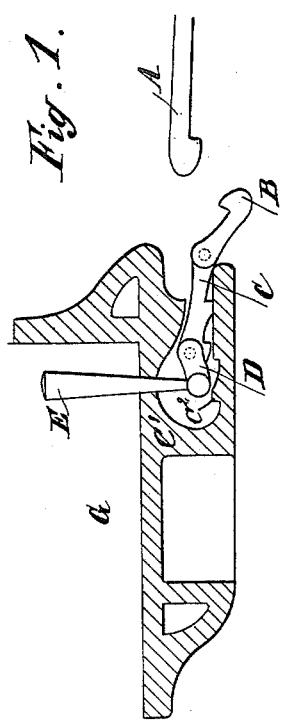
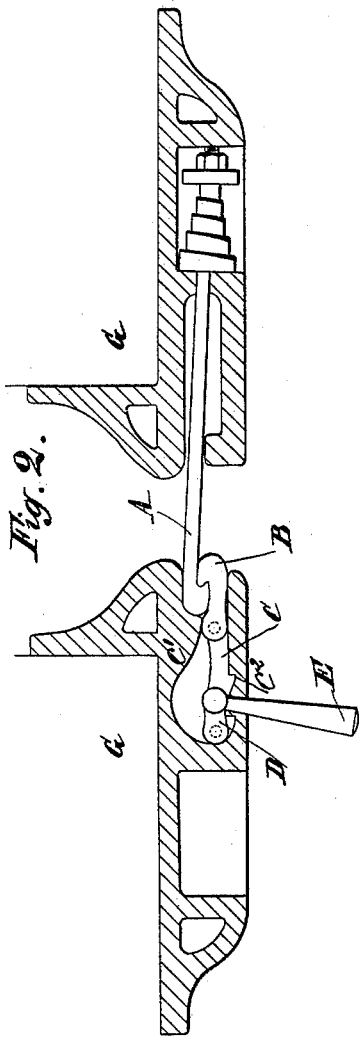
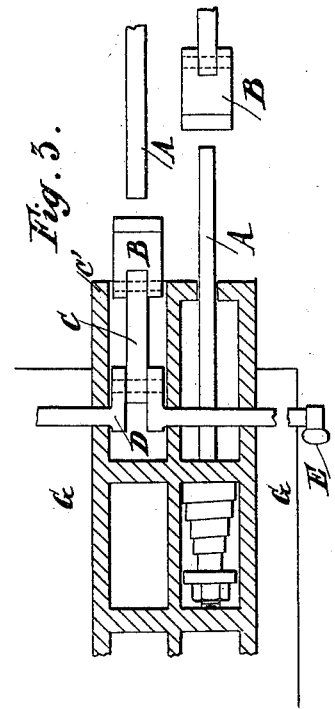
Witnesses:
Inventor:
Klaas Zwart
By Richards & Co.
his Attorneys.

UNITED STATES PATENT OFFICE.

KLAAS ZWART, OF KAMPEN, NETHERLANDS.

COUPLING FOR RAILWAY-CARRIAGES.

SPECIFICATION forming part of Letters Patent No. 626,263, dated June 6, 1899.

Application filed February 21, 1899. Serial No. 706,407. (No model.)

*To all whom it may concern:*

Be it known that I, KLAAS ZWART, a subject of the Queen of the Netherlands, residing at Kampen, in the Kingdom of the Netherlands, have invented certain new and useful Improvements in Couplings for Railway-Carriages and other Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to a new coupling for coupling railway-carriages and other vehicles. This coupling is distinguished from others by its construction and by its easy and certain operation.

The invention is illustrated in the accompanying drawings, in which—

Figure 1 is a sectional view showing the coupling unfastened. Fig. 2 is a like view showing the coupling fastened, and Fig. 3 is a plan view of the coupling.

To the wagon or other vehicle G is fixed a hook and spring A, which engage with the hook B of the other wagon or other vehicle G'. The hook B is pivoted to a short bar C, which is pivoted to the crank D, at the extremities of which are the hand-levers E. This part C works in the fitting C', which latter is furnished with notches $C^2$, in which engage the teeth of C.

When it is desired to operate the coupling, the hand-lever E should be turned upward, which results in the crank D becoming placed horizontally outward and the hook B becoming displaced. When now the hook A is placed in the hook B and when the hand-lever E is turned downward, the crank D will be turned to the left and will draw the two wagons or other vehicles together.

The two hooks A and B are placed in a chamber of their own. Fig. 2 shows the two hooks connected. The bar C is furnished on the under side with two accessories in the form of hooks, which engage when the coupling is fastened (see Fig. 2) in corresponding spaces $C^2$, which will partially relieve the crank.

The hook B is wide to permit the hook A to have sufficient freedom of motion in the curves without releasing the hook B.

When the coupling is fastened, the hand-lever E is held in its position by a stop or other similar arrangement.

The coupling is double on each wagon or other vehicle, so that at each extremity of the wagon or other vehicle is a hook A and a hook B, which engage in the corresponding hooks B and A of the other wagon or other vehicle.

Having fully described my invention, what I claim, and desire to secure by Letters Patent, is—

1. A coupling for railway-vehicles and the like comprising a hook carried by one vehicle, a corresponding hook located in a socket in the other vehicle, and means for projecting said second hook from the socket to engage and disengage the first hook and for retracting it together with the first hook into the socket to hold said first hook, substantially as described.

2. In a railway-coupling, the combination with the hook A carried by one vehicle, a second hook B carried in a socket on the other vehicle, a rocking crank-shaft carried by said other vehicle, and a link connecting said crank-shaft with said hook B, for advancing and retracting the same, said link having a shoulder or projection engaging a corresponding shoulder in the socket, substantially as described.

3. A coupling for railway-carriages and other vehicles consisting of the combination of a hook and spring acting on said hook carried by a fitting fixed to one railway-vehicle and a hook attached to a short bar attached to a crank mounted in a fitting fixed to another railway-vehicle, a hand-lever fixed on the crank-axis, hooks on the under side of said short bar, recesses in the fitting to receive said hooks and a space in the fitting to receive the coacting hooks when the latter are connected together substantially as herein set forth.

In testimony that I claim the foregoing as my invention I have signed my name in presence of two subscribing witnesses.

KLAAS ZWART.

Witnesses:
GERRIT CORNELIS OTTEN,
AIRR HARRY VOORWINDEN.